July 7, 1959 H. A. RAHMEL 2,893,809

MONITORING SYSTEM FOR WAVE SIGNAL RECEIVERS

Filed Nov. 29, 1955 2 Sheets-Sheet 1

INVENTOR.
HENRY A. RAHMEL
BY
Mason, Kolehmainen, Rathburn and Wyss.
Attys.

MONITORING SYSTEM FOR WAVE SIGNAL RECEIVERS

Filed Nov. 29, 1955 2 Sheets-Sheet 2

INVENTOR.
HENRY A. RAHMEL
BY
Mason, Kolehmainen, Rathburn and Wyss.
Attys.

United States Patent Office 2,893,809
Patented July 7, 1959

2,893,809

MONITORING SYSTEM FOR WAVE SIGNAL RECEIVERS

Henry A. Rahmel, Evanston, Ill., assignor to A. C. Nielsen Company, Chicago, Ill., a corporation of Delaware Application November 29, 1955, Serial No. 549,685
1 Claim. (Cl. 346—37)

The present invention relates to wave signal receiver monitoring apparatus and more particularly to improved apparatus which may be facilely attached to a television receiver for recording the condition of operation thereof throughout an extended period of time.

Generally speaking, the effectiveness of any particular television or radio program as an advertising media is dependent upon the average size of the listening audience, the average period of listening to the particular program and the variations in the size of the listening audience on a periodic basis. All of this information may be obtained by providing, at a number of selected receivers, data accumulating and recording apparatus for producing a permanent record of those periods of time during which the associated receiver is energized and the particular stations to which it is tuned during these periods.

For many years it has been the practice to mointor a number of selected radio receivers to determine the popularity of certain radio programs so as to evaluate their actual effectiveness for the advertising of particular products, and accordingly, a number of monitoring systems have been developed for this purpose, the most commonly used ones employing, at each receiver being monitored, apparatus which produces a permanent record of the stations tuned in by the receiver and the periods of time during which these stations are tuned in, so that by correlating the periods of time during which the receiver is energized with the stations which are tuned in during those periods, there is provided an indication of the programs to which that receiver was tuned.

Ordinarily, monitoring apparatus used in connection with the monitoring of broadcast type radio receivers utilizes a recorder of the single stylus or multiple styli type, which recorder is energized whenever the associated receiver is energized, the styli being conditioned either mechanically or electrically to make a permanent entry on a record medium of the tuning condition of the receiver. In those types of monitoring apparatus which employ a mechanical connection between the radio receiver and the recorder it is the usual practice to provide either a belt-drive type of connection or a Bowden wire connection for coupling information from the receiver to the recorder, and such recorders usually employ a single stylus which is moved to selected positions across the width of a movable tape recording medium to provide a visual indication of the operating condition of the associated receiver throughout extended periods of time. In those types of apparatus which employ an electric connection between the radio receiver and recorder for coupling to the recorder an electric signal indicative of the station tuned in by the receiver, it is common practice to employ a multiple styli type recorder and to locate a multiple contact rotary switch in such manner that respective contacts on the switch may be selected by a wiper connected to be driven by the tuning shaft of the receiver, respective ones of the styli being energized when an associated contact on the rotary switch is selected by the wiper. The styli in this latter type of recorder are positioned at spaced locations across the width of a movable record tape thereby to provide a visual record of receiver operating condition, which record is substantially the same in appearance as the record produced by the single styli type recorder system employing a mechanical link between the receiver and the recorder.

All of the above-described types of monitoring apparatus have been found to operate satisfactorily in connection with the monitoring of radio receivers, but complications arise when they are used for the monitoring of television receivers. Since, however, the radio receiver types of monitoring apparatus have been in use for a relatively long period of time such that the various portions thereof have reached a fairly well developed state, it would be desirable if certain portions, at least, of devices used for monitoring radio receivers could be used for monitoring television receivers. Moreover, since those organizations which monitor television receivers also monitor radio receivers, by utilizing common elements in both installations, the number of different parts which must be stocked is reduced. Furthermore, since the most complex and expensive portions of the above-described radio monitoring devices are the recorders, it would be desirable if a television monitoring device could be provided which would utilize the types of recorders presently used in radio monitoring apparatus. However, several principal problems arise when an attempt is made to provide television monitoring apparatus which incorporates recorders of the type used in radio monitoring apparatus. Firstly, because of the necessarily compact nature of television tuners, there is little room available for making a mechanical connection to the tuner shaft so that the angular position of the tuner shaft may be used to provide an indication of the tuning condition of the receiver. Secondly, television tuner shafts are rotatable through an infinite number of degrees whereas radio receiver tuners are not. And thirdly, which might be part of the first problem, the television station selector shaft is quite often the inner one of a plurality of coaxial shafts.

Therefore, a principal object of the present invention is to provide new and improved apparatus for monitoring television receivers.

Another object of the present invention is to provide a new and improved television receiver monitor in which information indicative of the tuning condition of the receiver is obtained by means coupled to the tuning shaft of the receiver and connected to a recorder.

A further object of the present invention is to provide a new and improved television receiver monitor in which portions thereof are suitable for use in radio receiver monitoring apparatus.

A still further object of the present invention is to provide new and improved apparatus for recording on a record medium information in regard to the tuning condition of a wave signal receiver.

Briefly, the above and further objects are realized in accordance with the present invention, by providing an improved mechanical device which is relatively small in size and adapted to be secured to the channel selector shaft of a television receiver tuner for transmitting to a recorder, information indicative of the angular position of the tuner shaft and thus indicative of the tuning condition of the receiver. In accordance with a further aspect of the invention, means are provided for actuating a multiple contact type rotary switch in response to rotation of the tuner shaft of a television receiver for operation of a multiple styli type recorder, and in accordance with other aspects of the invention mechanical devices are provided for operative attachment to the tuner shaft of a television receiver so as to provide direct mechanical coupling of tuning information from the shaft to a unitary stylus type of recorder.

The invention, both as to organization and method of operation, together with further objects and advantages thereof will best be understood by reference to the following detailed description taken in connection with the accompanying drawings, in which.

Figure 1:
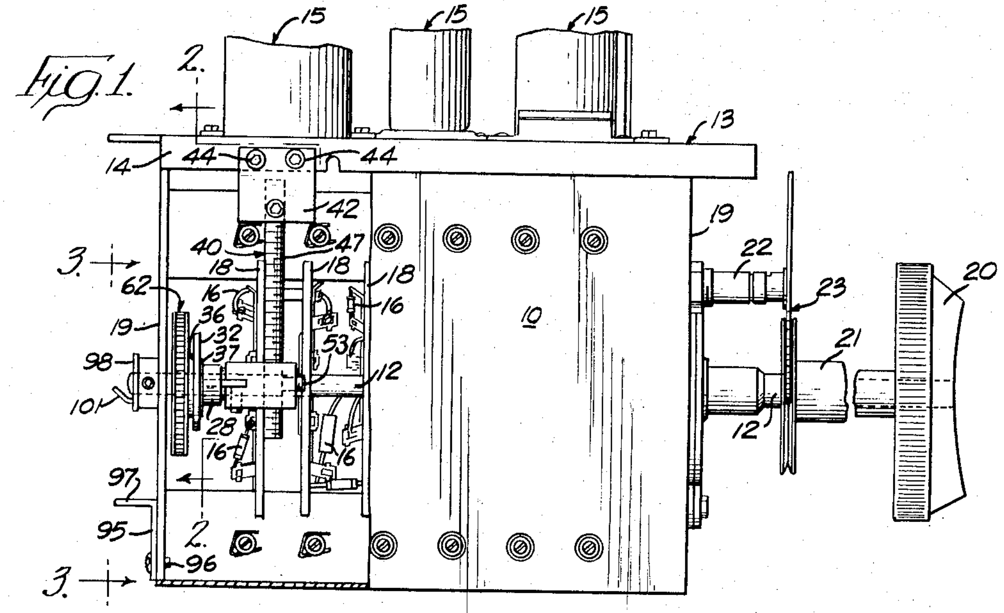
Fig. 1 is a side elevation view of a television tuner, the outer portions of which tuner are broken away to show an associated mechanical coupling arrangement embodying certain aspects of the present invention.
Figures 2, 5:
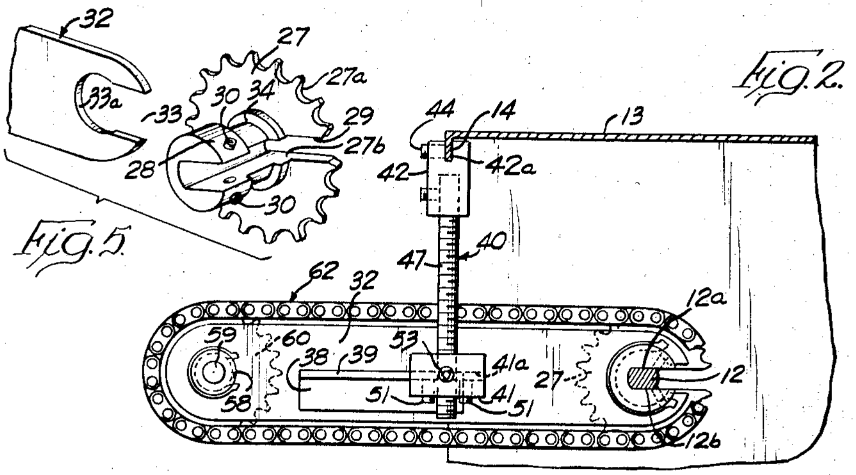
Fig. 2 is a fragmentary sectional view of the apparatus of Fig. 1 taken along the line 2—2 thereof with certain portions thereof broken away.
Fig. 5 is an exploded perpective view of a portion of the apparatus of Figs. 1 and 2.

Referring now to the drawings, and particularly to Figs. 1 and 2 thereof, there is shown a television tuner 10 which includes a principal support chassis 13 on which are mounted a plurality of electronic valves 15 which in conjunction with a plurality of other circuit elements 16 select one of a plurality of received television signals and supply it at a considerably reduced frequency to the IF amplifier stages of the television receiver. The selection of the television wave which is to be reproduced by the receiver is manually controllable by means of the selector shaft 12 which may extend outwardly of the receiver housing so as to be readily accessible to the user, and which has operatively connected thereto the wipers of a plurality of wafer type selector switches 18 which are spatially arranged along the shaft 12. As shown, the shaft 12 is suitably journaled in upright walls 19 which extend from the chassis 13 to provide a compartment in which the switches 18 and associated circuit elements 16 are disposed. The shaft 12, which is part of and as illustrated the inner shaft of a pair of concentric shafts 12 and 21, is adapted to be rotated by the knob 20 which is located at the external end thereof, and another shaft 22 which controls the fine tuning of the receiver is adapted to controllably be rotated in response to rotation of the shaft 21 through a drive connector 23.

As is well known, television signals are transmitted via electromagnetic waves having frequencies in the megacycle range, which necessitates the use of short leads for connecting the various electrical components which are included in the tuner 10. For this reason, and for purposes of minimizing the overall size of television receivers, the tuner 10, in particular, and all television tuners in general, are relatively compact with the switches 18 being closely spaced along the shaft 12. Therefore, in order to provide a mechanical link for controlling a recorder in accordance with the angular position of the shaft 12 it is important that the part of the mechanical link which is attached to the shaft 12 be relatively small in size so as to be readily attachable to the shaft 12 within the space bounded by the walls 19 and the chassis 13. In most tuners there is a space of approximately three-fourths of an inch between the rear wall 19 (left side in Fig. 1) and the next adjacent switch section 18, this being the greatest space available for making a mechanical connection to the shaft 12. However, as shown, that side of the switch 18 which is closest to the adjacent wall 19 has connected thereto a plurality of the circuit elements 16 so that the space which is actually available for making the mechanical connection to the shaft 12 is substantially less than the space between the switch section 18 and the wall 19.

Therefore, in order to provide a mechanical connection to the shaft 12 in the small space available, there is provided a gear member 27 having a longitudinal slot 29 extending throughout the full thickness thereof from the toothed periphery **27*a* to the central aperture 27*b* so that the gear 27 may be slipped onto the shaft 12 intermediate the switch section 18 and the wall 19 without disassembly of the tuner. A plurality of set screws 30 are threadedly received in suitable apertures in the boss portion of the gear 27 for securing the gear 27 to the shaft 12. It will be noted that in the illustrated embodiment of the invention the shaft 12 is provided with longitudinally directed flats 12*a* and 12*b*** on diametrically opposed sides thereof, but it will be understood that the present invention is also suitable for use with a television tuner having a truly cylindrical shaft.

Because of the close proximity of the electrical components of the tuner 10 to the location of the gear 27 and because of the high frequencies which are encountered in the tuner 10, it is important that any device which connects the gear 27 to the recording apparatus be mounted such that normal or even excessive vibration or jarring of the television receiver cannot cause this linkage to move into close proximity with any of the electrical elements in the tuner 10. Moreover, it is important that this coupling device can be readily assembled to the television tuner without disassembly of the tuner. To this end, there is provided a bracket plate 32 which has a slotted end portion 33 which extends over and is received in an annular recess 34 in a boss 28 disposed centrally of the gear 27. The slot 33 in the end portion of the plate 32 is slightly larger in width than the diameter of the associated portion of the boss 28 so as to provide a suitable bearing support between the bracket plate 32 and the gear 27 and normal rotation of the shaft 12 by the knob 20 is unimpaired. Moreover, a split wedging washer and bearing member 36 is provided between the face portion of the gear 27 and the bracket plate 32 and a split ring 37 is provided in the recess 34 between the wall of the recess and the side of the bracket plate 33. In this manner, movement of the plate 32 with respect to the axis of the shaft 12 is prevented, and because the circular inner end **33*a* of the slot in the end of the bracket 32 engages the inner wall of the recess 34, movement of the bracket 32 in a plane perpendicular to the longitudinal axis of the shaft 12** is prevented.

In accordance with the present invention, the bracket 32 is also supported on an adjustable connection 40 which is secured at one end thereof to the chassis 13 and at the other end thereof to a flange 39 of an angle plate 38 which is attached as by welding to the bracket 32. Adjustment of the length of the support 40 is provided by means of a screw 47 which is threadedly received in spaced apart blocks 41 and 42, the blocks 41 and 42 being respectively secured to the flange 39 and a flange 14 on the chassis 13 by flange receiving slots **41*a* and 42*a*. As shown, the block 42 is fixedly secured to the chassis 13 by means of a plurality of set screws 44 which are received in suitable apertures (not shown) in the block 42 so that the block may be brought up tightly against the flange 14. Consequently, the spacing between the blocks 41 and 42 is easily adjusted by rotating the block 41 with respect to the screw 47 which is fixedly secured in the block 42 by means of a plurality of suitable set screws 51. Also, a set screw 53 is provided in a suitable aperture in the block 41, for engagement with the screw 47 to maintain the block 41 at a fixed position relative to the block 42** which latter block may be provided with a similar set screw if desired.

In accordance with the aspect of the present invention embodied in the device of Figs. 1 and 2, a gear 60 is press-fitted on a shaft 59 which is suitably journaled in an aperture 58 in the bracket 32. A suitable link chain 62 is provided for mechanically and drivingly connecting the gear 27 to the gear 60, and because both gears have the same diameter and the chain 62 provides a slipless connection between them, the angular position of the gear 60 corresponds to the angular position of the gear 27 at all times.

Figure 8:
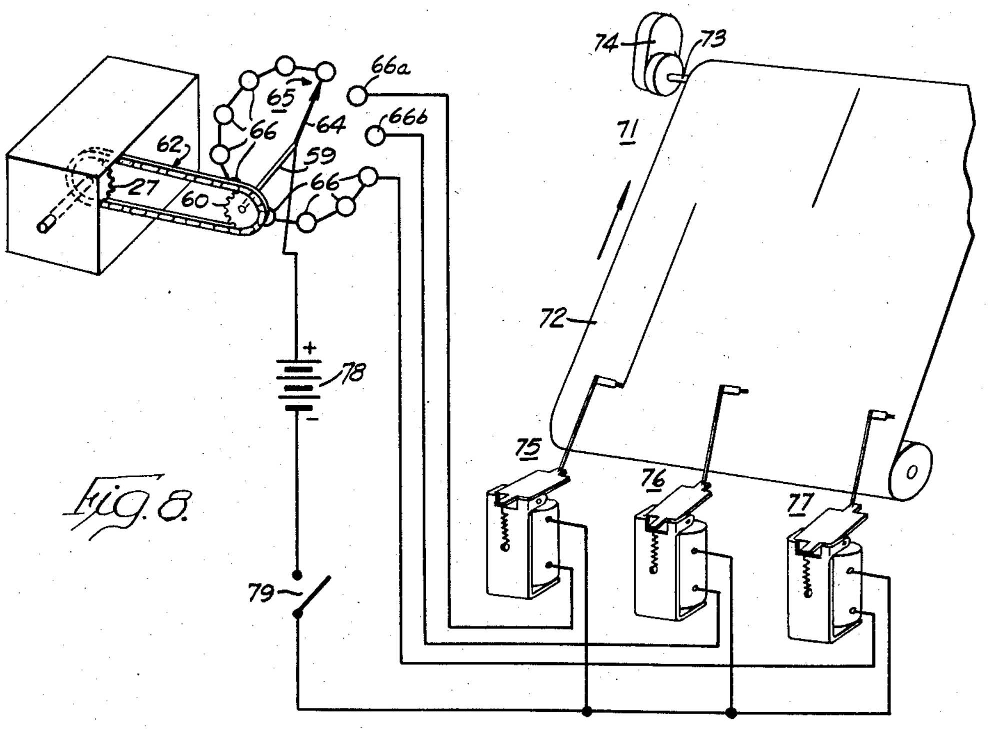
Fig. 8 is a diagrammatic illustration of an overall monitoring system embodying a further aspect of the present invention.

There is thus provided a sturdy and yet relatively simple mechanical link for indicating the angular position of rotation of the shaft 12 and transmitting such indication to a remote position. The shaft 59 may be connected to the recorder either by any suitable mechanical link such as, for example, a Bowden wire, or, as shown in Fig. 8, the shaft 59 may be used directly to control the position of a wiper 64 with respect to a plurality of contacts 66 in a multiple contact type switch 65. These contacts are electrically connected to a recorder 71.

Referring to Fig. 8, the switch 65 is provided with a wiper 64 which is operatively secured to the shaft 59 so that one of the plurality of contacts 66 thereof is selected in accordance with the angular position of the shaft 12, and hence, the station or channel to which the television received is tuned.

The recorder 71 is provided with a plurality of solenoid operated styli 75, 76 and 77 which are spatially arranged across the width of a suitable recording medium such as a paper or other tape 72. A take-up roller 73 is continuously driven by an electric timer motor 74 so that for each instant of time there is a different portion of the tape 72 adjacent each stylus. If expedient, the tape may be graduated along its length to facilitate use by an analysis organization of the information contained on the tape. Actually time marks may be applied during the recording operation. As shown, when any one of the solenoids is energized, the associated stylus is moved into engagement with the tape 72 and a visible mark is placed thereon.

In order selectively and individually to energize the styli 75, 76 and 77 in accordance with the tuning condition of the television receiver, each of the associated solenoids are serially connected with a source of voltage 78 between the wiper 64 and a respective one of the contacts 66. Therefore, for example, when the shaft 12 is so positioned that the stylus 76 is energized by virtue of the wiper 64 engaging the contact **66*b*, a visible mark is placed near the center of the tape 72, and a similar mark is made for every instant the shaft 12** is so positioned. Ordinarily, it is important to know the periods of energization of the receiver even though it is not tuned to a channel which is being monitored. Consequently, all of the contacts except the ones corresponding to channels being monitored are connected together and to one of the recorder styli so that whenever that stylus is energized, the receiver is energized and tuned to one of the channels which are not specifically monitored but which are generally designated as "all other" channels.

Since the shaft may be positioned to select a particular station even though the receiver is deenergized and no signal is reproduced thereby, the recording of erroneous data on the tape 72 is prevented by connecting a switch 79 in the circuit of the wiper 64. The switch 79 is preferably the energizatiton switch of the receiver so that whenever the receiver is energized, all of the styli circuits are automatically set up to be energized in accordance with the position of the shaft 12. In this manner, the possibility of error in the information recorded is avoided since the operation of the system is dependent directly upon the operation of the receiver.

Figure 7:
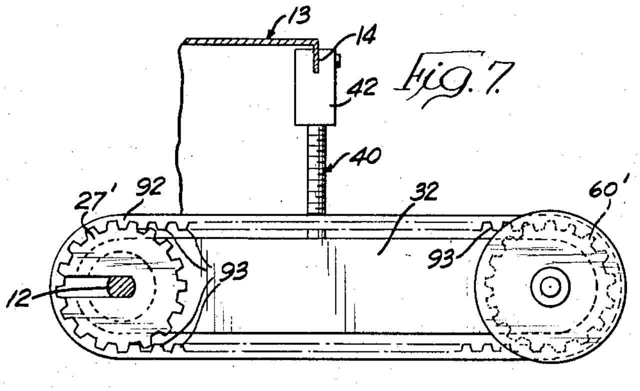
Fig. 7 is a side elevation view of another embodiment of the invention.

Referring to Fig. 7, wherein is shown a modified embodiment of the arrangement of Figs. 1 and 2, in which an endless belt 92, provided with teeth 93 on the inner portion thereof, is connected between the gears 27[1] and 60[1], whereby the data recorded on the tape 72 is an accurate representation of the operating condition of the receiver.

Figure 3:
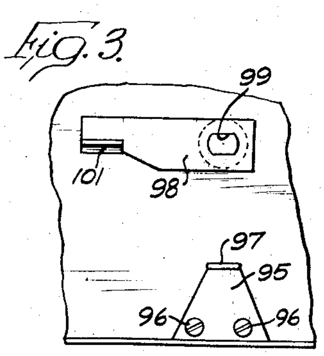
Fig. 3 is a fragmentary view of the device of Fig. 2 taken along the line 3—3 thereof.

In the event that it is desired to use the single stylus type of recorder directly linked to the tuner shaft 12, such as is disclosed in Rahmel Patent 2,660,508 in accordance with another aspect of the present invention, means are provided for limiting the rotation of the shaft 12 to an angle of slightly less than 360 degrees. Referring particularly to Figs. 1 and 3, there is shown a stop arrangement which may be employed in connection with television tuners of the type in which the shaft 12 extends a short distance beyond the rear wall 19 of the tuner 10. This stop comprises a flanged plate 95 which is attached to the rear wall 19 by a plurality of suitable screws 96 and is provided with an outwardly extending flange 97 at the top thereof for engagement with a stop member 98 which is provided with an aperture 99 at one end thereof for reception on the shaft 12. The stop member 98 extends a considerable distance from the shaft 12 and is provided with an off-turned portion 101 which engages the side edges of the flange 97 when the shaft 12 is rotated to either of its extreme positions. It should be understood that the stop described above will not be necessary or be used where the arrangement of Fig. 8 is employed.

Figure 4:
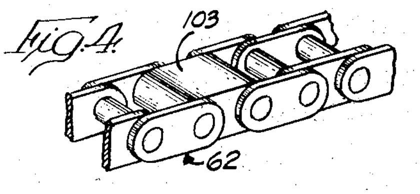
Fig. 4 is an enlarged perspective view of a portion of a chain drive and stop mechanism embodying another aspect of the present invention.

In many television receivers the tuners do not have a shaft which extends beyond the tuner wall, so that it becomes necessary to provide a stop within the tuner body itself. Although it might seem that a stop member could be secured to the shaft 12 for cooperation with another stop member mounted on one of the switch sections 18, it is found that the switch elements are much too fragile for this purpose and damage to the tuner results. Referring to the embodiment of Fig. 4, it will be seen that the chain 62 may be provided with a dead link 103 such that when the gear 27 is rotated to a position that the teeth thereof engage the dead link 103, rotation thereof is prevented, or when the gear 27 is rotated in the other direction rotation of the shaft 12 is limited when the dead link 103 engages one of the teeth on the gear 60. Therefore, by selecting the distance between the axes of rotation of the gears 27 and 60 to be equal to the effective circumference of each of the gears 27 and 60, the dead link 103 provides a stop which limits the rotation of the tuner shaft 12 to an angle slightly less than 360 degrees. In accordance with this embodiment of the invention, a minimum amount of space is required for incorporation of the stop member into the tuner and a minimum of a fracturing force is applied to the tuner 10.

Figure 6:
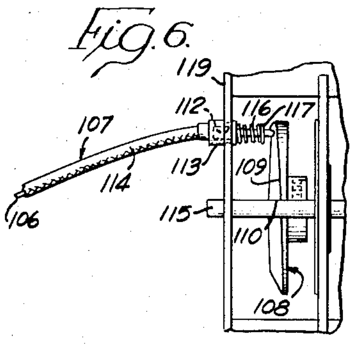
Fig. 6 is a fragmentary view of a television tuner to which is attached a portion of a television monitoring apparatus embodying another aspect of the present invention.

In Fig. 6 there is shown another embodiment of the invention wherein continuous rotation of the tuner shaft 12 may be converted into longitudinal movement of the inner wire 106 of a Bowden wire 107 for control of the stylus of a single stylus type recorder. In accordance with this aspect of the invention, there is provided a face cam member 108 having a slot 110 therein for facilitating attachment of the cam 108 to a television tuner shaft 115. A camming surface 109 is provided on the cam 108 for engagement with the inner wire 106 of the Bowden wire 107. In order to adapt a tuner for use in connection with this Bowden wire type of mechanical link, a hole 112 is drilled in the rear wall 119 and an adapter 113 to which is secured the outer cable 114 of the Bowden wire 107 is inserted in the hole 112 and attached to the wall 119. A coil spring 116 is slipped over the end of the wire 106 and an annular stop member 117 is suitably bonded as by soldering to the wire 106 near the end thereof such that the end of the wire 106 is resiliently urged into engagement with the face 109 of the cam 108. In order to insure that the wire 106 follows the cam face 109 during the steepest portion thereof, it is desirable that the diameter of the cam 108 be selected to be as large as is commensurate with the space available in the particular tuner with which the apparatus is to be connected. Moreover, where desired, a mechanical linkage may be provided for increasing the movement of the inner wire 106 or a multiplier may be provided at the recorder for increasing this movement to provide a better record. Moreover, in those television receivers in which the diameter of the cam 108 must be relatively small, a rotatable spherical member (not shown) may be attached to the end of the wire 106 for engagement with the cam surface 109.

While the invention has been described in connection with particular embodiments thereof, it will be understood that those skilled in the art may make many changes and modifications without departing from the invention. Therefore, in the appended claim it is intended to cover all such changes and modifications as fall within the true spirit and scope of the invention.

What is claimed as new and desired to be covered by Letters Patent of the United States is:

An apparatus for monitoring the tuning condition of a television receiver of the type including an infinitely rotatable tuning shaft, comprising, a support bracket adapted to be secured to the chassis of said television receiver, first and second gears spatially supported and journaled in said bracket, said first gear being slotted from the periphery thereof to a central aperture therein, said bracket being slotted from the periphery thereof to the portion thereof which provides the journal for said gear, supporting means for securing said support bracket on said shaft in a desired position, said supporting means being adjustable in one direction to move the slotted portions of said first gear and said bracket into alignment with but spaced from said tuning shaft and being adjustable in a second direction perpendicular to said first direction to move said bracket toward said tuning shaft so that said tuning shaft is received in said slotted portions, means for fixedly securing said first gear to said tuning shaft, connecting means between said first and second gears such that said gears rotate infinitely in unison in either direction, rotary switch means having a wiper and a plurality of individual contact members, said wiper being adapted to selectively contact respective ones of said contact members, said switch means being operatively connected to said second gear such that the angular position of said second gear is determinative of which of said contact members is in engagement with said wiper, and a recorder connected to said switch means and having a plurality of electrically operated styli selectively controlled by the setting of said wiper relative to said individual contact members.

References Cited in the file of this patent

UNITED STATES PATENTS

| | | |
|---|---|---|
| 2,175,937 | Elder et al. | Oct. 10, 1939 |
| 2,210,380 | Potter | Aug. 6, 1940 |
| 2,213,886 | Potter | Sept. 3, 1940 |
| 2,244,818 | Woodruff | June 10, 1941 |
| 2,305,834 | Woodruff | Dec. 22, 1942 |
| 2,521,564 | Bernard | Sept. 5, 1950 |
| 2,526,610 | Piton | Oct. 17, 1950 |
| 2,645,549 | Bateman et al. | July 14, 1953 |
| 2,801,896 | Krahulec | Aug. 6, 1957 |